No. 715,700. Patented Dec. 9, 1902.
R. P. SMITH.
BROILER.
(Application filed July 27, 1901.)
(No Model.)
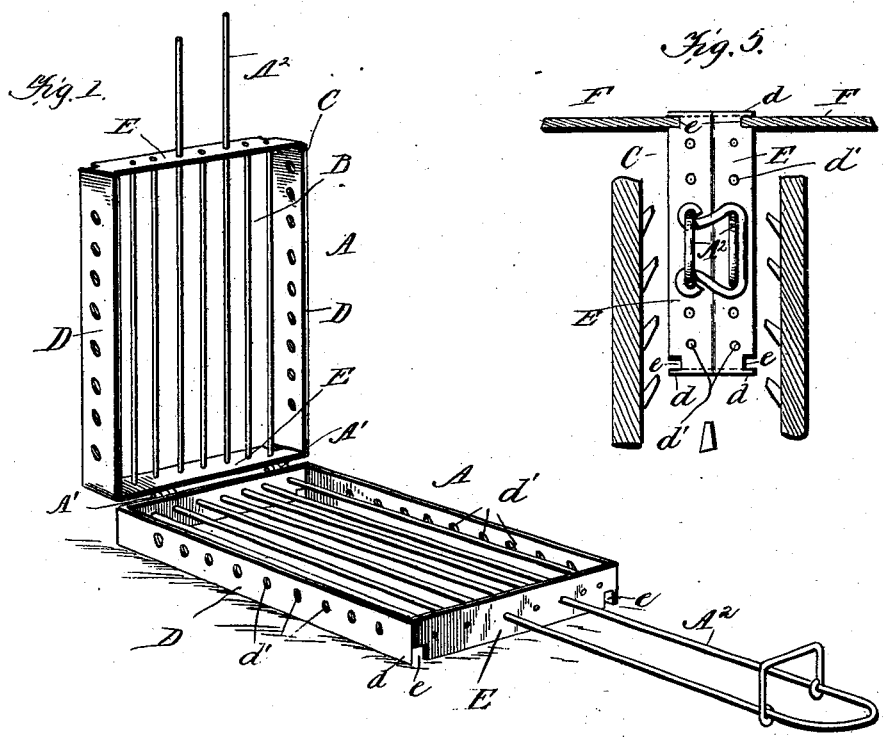
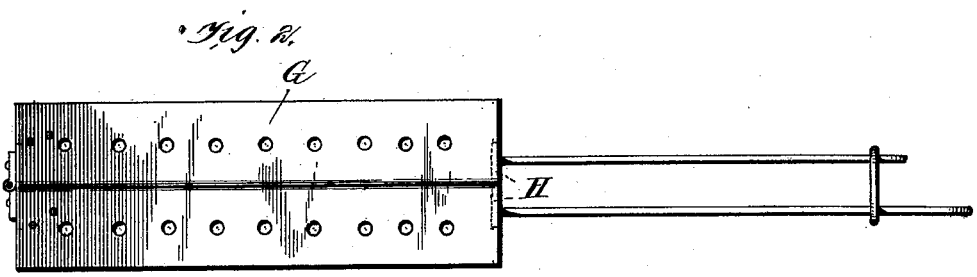
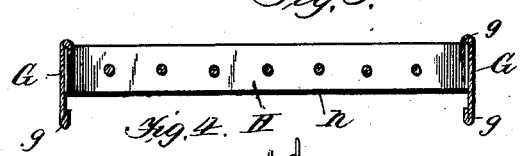
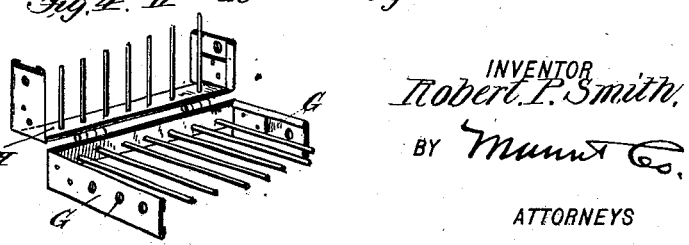
WITNESSES:
Fred D. Bradford
Perry B. Turpin
INVENTOR
Robert P. Smith
BY Munn & Co.
ATTORNEYS
THE NORRIS PETERS CO., PHOTO-LITHO., WASHINGTON, D. C.

UNITED STATES PATENT OFFICE.

ROBERT PIERCE SMITH, OF NEW YORK, N. Y., ASSIGNOR OF ONE-HALF TO ROBERT L. BANKS, OF NEW YORK, N. Y.

BROILER.

SPECIFICATION forming part of Letters Patent No. 715,700, dated December 9, 1902.

Application filed July 27, 1901. Serial No. 69,933. (No model.)

*To all whom it may concern:*

Be it known that I, ROBERT PIERCE SMITH, a citizen of the United States, and a resident of New York, in the county of New York and State of New York, have made certain new and useful Improvements in Broilers, of which the following is a specification.

My invention is an improvement in broilers, and especially in broilers intended for buffet and other use where the space is limited—such, for instance, as in the buffet-kitchens of parlor-cars, apartment-houses, or private residences, yachts, and the like; and the invention consists in certain novel constructions and combinations of parts, as will be hereinafter described and claimed.

In the drawings, Figure 1 is a perspective view of a broiler embodying my invention. Fig. 2 is a side view, Fig. 3 is a detail sectional view, and Fig. 4 a detail perspective view, partly broken away, showing a somewhat different construction of broiler from that shown in Fig. 1; and Fig. 5 illustrates the broiler shown in Fig. 1 in use.

Referring now to the construction shown in Fig. 1, it will be seen that the broiler comprises the two similar grid-sections A, which are hinged together at one end A' and are provided at their other ends with the handles $A^2$. The grid-sections are composed of the wires or irons B and the frame C, which is shown as composed of the side plates D and the end plates E, such plates D and E being perforated with numerous holes, as shown in Figs. 1 and 5, and the side plates D being provided at their outer edges with flanges or extensions $d$, which are arranged to overlie the spaced-apart top plates F of a gas-stove, as shown in Fig. 5. This lateral extension or flanged construction $d$ is shown in Figs. 1 and 5 as secured by the outer edges of the side plates D, the end plates E being notched at $e$ in their outer edges at their ends to expose the extending portions $d$ of the plates D, as will be understood from Figs. 1 and 5. I provide these overlapping portions $d$ at both edges of the broiler, so it can be reversed side for side from the position shown in Fig. 5 in the use of the device as may be desired. It will be noticed that the perforations $d'$ in the frame-plates of the broiler permit a free circulation of the heat, and thus facilitate the broiling operation.

In the construction shown in Figs. 2, 3, and 4 instead of notching the end plates, as shown at $e$, Fig. 1, the lateral extensions of the side plates are secured by projecting said side plates outwardly beyond the end plates of the broiler, the side plates G having their lateral extensions doubled, as shown at $g$, and arranged to rest upon the spaced-apart plates F and the end plates H having their outer edges extending on straight lines from end to end, as shown at $h$ in Fig. 3.

The broiler, as shown in Figs. 2, 3, and 4, is formed in sections hinged together at one end and provided at their other ends with handles similar to the construction shown in Fig. 1.

In applying the broiler to the stove it is simply slipped through a slot in the side of the stove, with its flanges $d$ or $g$ overlying the top plates F of the stove, as shown in Fig. 5.

It will be understood that the slotted construction shown in Fig. 1 may be preferred, because when the broiler is applied to the stove, as shown in Fig. 5, it will be held from displacement except in the longitudinal direction in which it was inserted.

Having thus described my invention, what I claim as new, and desire to secure by Letters Patent, is—

1. The broiler herein described comprising the two grid-sections hinged together at one end and provided at their other ends with handles, each section being composed of the wires or rods and the frame having side and end plates, the end plates being provided in their outer edges with notches and the side plates being extended at their outer edges over the said notches whereby the broiler can be engaged with a stove when fitted therein, substantially as set forth.

2. A broiler having its side plates extending outwardly in planes at right angles to that of the broiling-surface forming flanges whereby to overlie the spaced-apart plates of a stove and extending from end to end of the broiler to prevent escape of heat at the outer side thereof, substantially as set forth.

3. A broiler provided with end and side plates and having end plates provided in their outer edges at their ends with notches and the side plates extending laterally outward to overlie the said notches, substantially as set forth.

ROBERT PIERCE SMITH.

Witnesses:
H. J. LINDLEY,
E. W. LE BLON.